United States Patent Office 3,813,388
Patented May 28, 1974

3,813,388
7-[D-(α-AMINO-α-PHENYL-, 2-THIENYL- AND 3-THIENYL-ACETAMIDO)] - 3 - [S-(2-METHYL-1,2,3-TRIAZOLE - 4 - YL)THIOMETHYL]-3-CEPHEM-4-CARBOXYLIC ACIDS
Leonard Bruce Crast, Jr., 8623 Weaver Road, R.D. 4, Clay, N.Y. 13041
No Drawing. Filed Jan. 31, 1972, Ser. No. 222,295
Int. Cl. C07d 99/24
U.S. Cl. 260—239.1                    6 Claims

ABSTRACT OF THE DISCLOSURE

7-[D-(α-amino-α-phenyl-, 2-thienyl- and 3-thienyl-acetamido)]-3-[S-(2 - methyl - 1,2,3 - triazole - 4 - yl)thiomethyl]-3-cephem-4-carboxylic acids and their nontoxic, pharmaceutically acceptable salts are valuable as antibacterial agents, as nutritional supplements in animal feeds, as agents for the treatment of mastitus in cattle and as therapeutic agents in poultry and animals, including man, and are especially useful in the treatment, particularly by oral administration, of infectious diseases caused by many Gram-positive and Gram-negative bacteria.

BACKGROUND OF THE INVENTION (1) Field of the invention

The cephalosporins of the present invention possess the usual attributes of such compounds and are particularly useful in the treatment of bacterial infections by oral administration.

(2) Description of the prior art

Cephalothin and cephaloridine are well known antibacterial agents; see U.S. Pats. 3,218,318; 3,449,338 and 3,498,979. The literature also contains considerable data on the activity of cephaloglycin and cephalexin; see U.S. Pats. 3,303,193 and 3,507,861 and Great Britain 985,747 and 1,054,806. Newer cephalosporins include cefazolin and cephapirin; see U.S. Pat. 3,516,997 [and also Netherlands 6805179 (Farmdoc 34,328) and South Africa 684,513] and U.S. Pat. 3,422,100.

The literature on cephalosporins has been reviewed by E. P. Abraham, Quart. Rev. (London), 21, 231 (1967) by E. Van Heyningen, Advan. Drug Res., 4, 1–70 (1967) and briefly in Annual Reports in Medicinal Chemistry, Academic Press, Inc., 111 5th Ave., New York, N.Y. 10003, by L. C. Cheney on pp. 96 and 97 (1967) and by K. Gerzon and R. B. Morin on pp. 90–93 (1968) and by Gerzon on pp. 79–80 (1969). New cephalosporins are frequently reported at the annual Interscience Conference on Antimicrobial Agents and Chemotherapy as illustrated by Sassiver et al., Antimicrobial Agents and Chemotherapy—1968, American Society for Microbiology, Bethesda, Md., pp. 101–114 (1969) and by Nishida et al., ibid., 236–243 (1970). Two excellent recent reviews are The Cephalosporins; Microbiological, Chemical and Pharmacological Properties and Use in Chemotherapy of Infection, L. Weinstein and K. Kaplan, Annals of Internal Medicine, 72, 729–739 (1970) and Structure Activity Relationships Among Semisynthetic Cephalosporins, M. L. Sassiver and A. Lewis, Advances in Applied Microbiology, edited by D. Perlman, 13, 163–236 (1970), Academic Press, New York.

The preparation of various 7-[α-amino-arylacetamido]-cephalosporanic acids and the corresponding desacetoxy compounds in which aryl represents unsubstituted or substituted phenyl or 2- or 3-thienyl is described, for example, in British Specifications 985,747, 1,017,624, 1,054,806 and 1,123,333, in Belgium Pat. 696,026 (Farmdoc No. 29,494), in U.S. Pats. 3,311,621, 3,352,858, 3,489,750, 3,489,751, 3,489,752 and 3,518,260, in Japanese Pat. 16,871/66 (Farmdoc 23,231), by Spencer et al., J. Med. Chem., 9(5), 746–750 (1966), by Ryan et al., J. Med. Chem., 12, 310–313 (1969) and by Kurita et al., J. Antibiotics (Tokyo) (A), 19, 243–249 (1966) and see also U.S. Pat. 3,485,819.

Netherlands Pats. 6811676 (Farmdoc 36,349) and 6812382 (Farmdoc 36,496) and U.S. Pats. 3,489,750 and 3,489,751 disclose ring-substituted cephaloglycins.

Various 7 - [α-amino-arylacetamido]cephalosporins in which one hydrogen of the α-amino group is replaced by a carbonyl group which is attached in turn to another moiety have been reported. The earliest were the cephaloglycin and cephalexin precursors in which use was made of a common peptide blocking group such as carbobenzyloxy as illustrated by U.S. Pat. 3,364,212, Belgian Pat. 675,298 (Farmdoc 22,206), South African Pat. 67/1,260 (Farmdoc 28,654) and Belgian Pat. 696,026 (Farmdoc 29,494). Related compounds include those of U.S. Pats. 3,303,193 and 3,311,621 and 3,518,260.

Various cephalosporins, including cephalosporin C on occassion but not cephaloglycin, have been reacted with nucleophilic, aromatic mercaptans to produce compounds having the structure

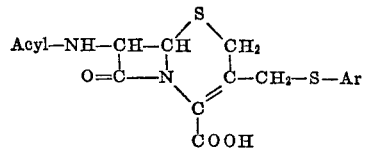

In U.S. Pat. 3,278,531 Ar is phenyl or certain substituted phenyls or certain aromatic heterocyclic rings named, for example, in column 5. Similar nucleophiles, e.g. 2-mercaptopyrimidines, are disclosed in U.S. 3,261,832 and Great Britain 1,101,422 and U.S. 3,479,350 and U.S. 3,502,665, all issued to Glaxo. A parallel disclosure is found in Great Britain 1,109,525 to Ciba, e.g. in definition "h" for R₃. Additional nucleophiles of this type were disclosed by Fujisawa in Belgium 714,518 (Farmdoc 35,307; Netherlands 6806129 and South Africa 68/2,695), in Canada 818,501 (Farmdoc 38,845), in Great Britain 1,187,323 (Farmodoc 31,936; Netherlands 6714888), in U.S. 3,530,123 and in U.S. 3,516,997 (Farmdoc 34,328; Netherlands 6805179) which includes the compound named cefazolin, which has a tetrazolylacetyl sidechain on the 7-amino group and a 5-methyl-thiadiazolylthiomethyl group at the 3-position and is described at some length in the scientific literature, e.g. in Antimicrobial Agents and Chemotherapy—1969, American Society for Microbiology, Bethesda, Md. at pp. 236–243 and in J. Antibiotics (Iapan), 23(3), 131–148 (1970).

More recently, replacement of the 3-acetoxy group of a cephalosporin by various heterocyclic thiols has been disclosed in U.S. 3,563,983 and in Netherlands 7005519 (Farmdoc 80,188R) where the sidechains were, for example, 7-α-aminophenylacetamido and typical heterocyclic thiols were 2-methyl-1,3,4-thiadiazole-5-thiol and 1-methyl-1,2,3,4-tetrazole-5-thiol.

Various cephalosporins having the structure

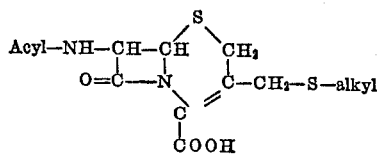

in which acyl represents various sidechains including α-aminophenylacetyl have been described in some of the above and by Glaxo in Belgium 734,532 (Farmdoc 41,619) and in Belgium 734,533 (Farmdoc 41,620).

Cephalosporins having the structure

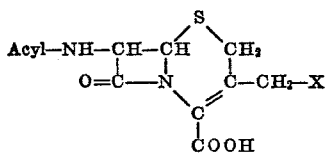

where X includes

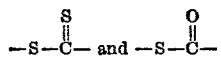

are disclosed in some of the above and in U.S. 3,239,515, 3,239,516, 3,243,435, 3,258,461, 3,431,259 and 3,446,803.

Related publications in the scientific literature include J. Med. Chem., 8, 174–181 (1965) and J. Chem. Soc. (London), 1959–1605 (1965), 5015–5031 (1965) and 1959–1963 (1967).

SUMMARY OF THE INVENTION

This invention comprises the amphoteric compound of the formula

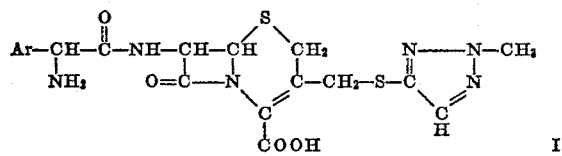

wherein Ar represents phenyl, 2-thienyl or 3-thienyl and having the D configuraiton and existing primarily as the zwitterion, and its nontoxic pharmaceutically acceptable salts.

Such salts include the nontoxic carboxylic acid salts thereof, including nontoxic metallic salts such as sodium, potassium, calcium and aluminum, the aluminum salt and substituted ammonium salts, e.g. salts of such nontoxic amines as trialkylamines, including triethylamine, procaine, dibenzylamine, N-benzyl-betaphenethylamine, 1-ephenamine, N,N' - dibenzylethylenediamine, dehydroabietylamine, N,N'-bis-dehydroabietylethylenediamine, N-(lower)-alkylpiperidine, e.g., N-ethylpiperidine, and other amines which have been used to form salts with benzylpenicillin; and the nontoxic acid addition salts thereof (i.e., the amines salts) including the mineral acid addition salts such as the hydrochloride, hydrobromide, hydroiodide, sulfate, sulfamate and phosphate and the organic acid addition salts such as the maleate, acetate, citrate, oxalate, succinate, benzoate, tartrate, fumarate, malate, mandelate, ascorbate and the like.

The amphoteric compound of the present invention is prepared according to the present invention by coupling with 7 - amino - 3 - [S - (2 - methyl-1,2,3-triazole-4-yl) thiomethyl] - 3 - cephem - 4 - carboxylic acid (II) (or a salt or easily hydrolyzed ester thereof including those of U.S. Pat. 3,284,451 and any of the silyl esters described in U.S. Pat. 3,249,622 for use with 7-aminopenicillanic acid and used in Great Britain 1,073,530) a particularly acid or its functional equivalent as an acylating agent for a primary amino group. After coupling, the blocking group is removed to give the desired product. Said acid has the formula

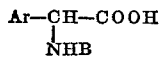

wherein Ar represents phenyl, 2-thienyl or 3-thienyl and wherein B represents a blocking group of the type used either in peptide syntheses or in any of the numerous synthesis of α-aminobenzylpenicillin from 2-phenylglycine. Particularly valuable blocking groups are a proton, as in the compound of the formula

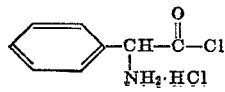

or a β-diketone as in Great Britain 1,123,333, e.g., methyl acetoacetate, in which case the acid containing the blocked amino group is preferably converted to a mixed anhydride, as with ethyl chloroformate, before reaction with compound II or a salt thereof to form the desired product I after acid cleavage.

Further to the discussion above of blocking groups used on the free amino group of the sidechain acid during its coupling with compound II, the blocking group is then removed to form the products of the present invention, e.g., the t-butoxy-carbonyl group is removed by treatment with formic acid, the carbobenzyloxy group is removed by catalytic hydrogenation, the 2-hydroxy-1-naphthacarbonyl group is removed by acid hydrolysis and the trichloroethoxycarbonyl group by treatment with zinc dust in glacial acetic acid. Obviously other functionally equivalent blocking groups for an amino group can be used and such groups are considered within the scope of this invention.

Thus, with respect to said acid to be used to couple with compound II, functional equivalents include the corresponding acid anhydrides, including mixed anhydrides and particularly the mixed anhydrides prepared from stronger acids such as the lower aliphatic monoesters of carbonic acid, or alkyl and aryl sulfonic acids and of more hindered acids such as diphenylacetic acid. In addition, an acid azide or an active ester or thioester (e.g., with p-nitrophenol, 2,4-dinitrophenol, thiophenol, thioacetic acid) may be used or the free acid itself may be coupled with compound II after first reacting said free acid with N,N'-dimethylchloroformiminium chloride [cf. Great Britain 1,008,170 and Novak and Weichet, Experientia XXI, 6, 360 (1965)] or by the use of enzymes or of an N,N'-carbonyldiimidazole or an N,N'-carbonylditriazole [cf. South African patent specification 63/2,684] or a carbodiimide reagent [especially N,N'-dicyclohexylcarbodiimide, N,N'-diisopropylcarbodiimide or N-cyclohexyl-N'-(2-morpholinoethyl)carbodiimide; cf. Sheehan and Hess, J. Amer. Chem. Soc., 77, 1067 (1955)], or of alkylylamine reagent [cf. R. Buijle and H. G. Viehe, Angew. Chem. International, edition 3, 582 (1964)], or of a ketenimine reagent [cf. C. L. Stevens and M. E. Mond, J. Amer. Chem. Soc., 80 (4065)] or of an isoxazolium salt reagent [cf. R. B. Woodwar, R. A. Olofson and H. Mayer, J. Amer. Chem. Soc., 83, 1010 (1961)]. Another equivalent of the acid chloride is a corresponding azolide, i.e., an amide of the corresponding acid whose amide nitrogen is a member of an quasiaromatic five-membered ring containing at least two nitrogen atoms, i.e., imidazole, pyrazole, the triazoles, benzimidazole, benzotriazole and their substituted derivatives. As an example of the general method for the preparation of an azolide, N,N'-carbonyldiimidazole is reacted with a carboxylic acid in equimolar proportions at room temperature in tetrahydrofuran, chloroform, dimethylformamide or a similar inert solvent to fom the carboxylic acid imidazolide in practically quantitative yield with liberation of carbon dioxide and one mole of imidazole. Dicarboxylic acids yield dimidazolide. The by-product, imidazole, precipitates and may be separated and the imidazolide isolated, but this is not essential. The methods for carrying out these reactions to produce a cephalosporin and the methods used to isolate the cephalosporin so produced are well known in the art.

In the treatment of bacterial infections in man, the compounds of this invention are administered orally or parenterally, in accordance with conventional procedures for antibiotic administration, in an amount of from about 5 to 200 mg./kg./day and preferably about 5 to 20 mg./kg./day in divided dosage, e.g., three to four times a day. They are administered in dosage units containing, for example, 125 or 250 or 500 mg. of active ingredient with suitable physiologically acceptable carriers or excipients. The dosage units are in the form of liquid preparations such as solutions or suspensions or as solids in tablets or capsules.

Exactly 200 g. of 7-aminocephalosporanic acid (7-ACA) was suspended in 500 ml. of acetone and a solution of 240 g. of p-toluenesulfonic acid in 500 ml. of acetone was added in one charge. After stirring for five minutes, at room temperature, the mixture was filtered through diatomaceous earth ("Super Cel") and the bed washed with 150 ml. of acetone (the insoluble matter weighed about 30 g.). Then 80 ml. of water was added to the filtrate and, while stirring, the p-toluene-sulfonate salt crystallized out after scratching on the inside of the flask with a glass rod. The suspension was stirred in an ice-salt bath for thirty minutes and filtered cold. It was washed with 2× 200 ml. of cold acetone (0° C.) and air dried; yield 250 g. of salt. This p-toluene-sulfonate salt of 7-ACA was stirred in 2 liters of methanol and the insoluble matter filtered through "Super Cel." The filtrate was placed in a five liter 3 neck flask and 2 liters of water were added. Then the pH was adjusted to 4 by the addition of concentrated ammonium hydroxide with cooling and the suspension stirred for one hour at 0° C. The product was collected by filtration and washed with 2× 100 ml. $H_2O$ (0° C.) and 3× 1 liter acetone (room temperature). After air drying, the yield of 7-ACA was 145 g.

Reference: Glaxo, British Pat. 1,104,938 (1968).

The following examples are given in illustration of, but not in limitation of, the present invention. All temperatures are in degrees centigrade. 7-aminocephalosporanic acid is abbreviated as 7-ACA and methyl isobutyl ketone as MIBK. "Skellysolve B" is a petroleum ether fraction of B.P. 60–68° C. consisting essentially of n-hexane.

Sodium D-α-[1-carbomethoxypropen-2-yl)-amino]-phenylacetate

Lit. ref. F. Dane, F. Oreis, P. Konrad, T. Dockner, *Agnew. Chem. Intern. Ed. Engel., 1*, 658 (1962); F. Dane and T. Dockner *Agnew. Chem., 76*, 342 (1964); Spencer, Flynn, Roeske, Sin and Chauvette, J. Med. Chem., 9, 746–50 (1966); U.S. Pat. 3,496,171 (Lilly).

To a well stirred mixture of 40 g. (1 mole) of NaOH in 40 ml. of $H_2O$ and one liter of benzene was added 151.6 (1 mole) of D-(—)-phenylglycine. The mixture was held at about 55° C. for 30 minutes and then with vigorous stirring 116 g. (1 mole) of methyl acetoacetate was added and the mixture stirred and heated at reflux until no more water was collected in the Dean Stark trap. Next one liter of acetone was added with the heat removed and then the slurry was cooled and stirred 30 minutes in an ice-salt bath. The product was collected by filtration, washed well with copious amounts of acetone and air dried. Yield was 191 g., dec. pt. 252° C., $[\alpha]_D^{22\,°\,C.}$ +207° (C.=1% $H_2O$).

Synthesis of potassium 1,2,3-triazole-5-thiolate:

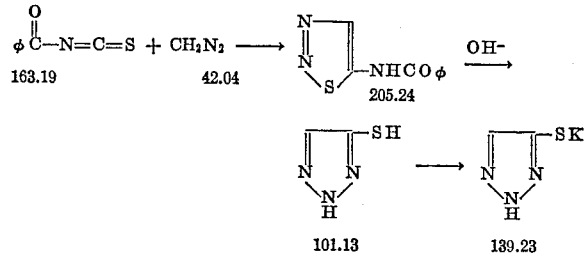

The synthesis of the thiol was accomplished by a procedure essentially identical to that described in the literature [J. Goerdler and G. Gnad, Chem. Ber., 99, 1618 (1966)].

5-benzamido-1,2,3-thiadiazole

To a stirred solution of benzoylisothiocyanate (50.6 g., 310 mmoles) in commercial anhydrous ether (400 ml.), maintained at 0° and in a nitrogen atmosphere, was added dropwise with vigorous stirring, 0.685 N ethereal diazomethane (453 ml., 310 mmoles). When the addition was completed, the mixture was stirred for 1 hour at 0°, the solid was collected by filtration and dried *in vacuo*. The melting point of the crude material (23.3 g.) thus obtained was observed somewhere in the region 232 to 257°. Goerdler reported M.P. 267° for the pure material. A small second crop (2.1 g.) was obtained by evaporation of the mother liquor *in vacuo*. The total yield was therefore 40%.

1,2,3-triazole-5-thiol

A solution of the above benzamido compound (8.2 g., 40 mmoles) in 2 N sodium hydroxide (80 ml., 160 mmoles) was heated under reflux temperature in a nitrogen atmosphere for 24 hours. The solution was cooled to 0° in ice, and concentrated hydrochloric acid (26 ml.) was added, while a continuous stream of nitrogen was passed through the solution. The benzoic acid which precipitated was collected by filtration; the filtrate was saturated with sodium chloride and the additional benzoic acid which separated was removed by filtration. The filtrate was immediately extracted with ethyl acetate, the extract was washed with saturated salt solution, dried over magnesium sulfate and then evaporated *in vacuo*. The viscous oil which remained was immediately evaporatively distilled *in vacuo* (70–75°/0.001 mm.) to give an oil (2.84 g., 70%) which solidified (M.P. 52–59°; Goerdler reported M.P. 60°) spontaneously.

Potassium 1,2,3-triazole-5-thiolate

To a solution of the above thiol (2.84 g., 28.1 mmoles) in absolute ethanol (28 ml.) was added 1.93 N alcoholic potassium hydroxide solution (14.5 ml.). The solution was then diluted with anhydrous ether until crystallization of the salt was completed. The solid was collected by filtration, washed with ether, and dried *in vacuo*. The salt obtained in this manner (3.65 g., 93%) had M.P. 225° with decomposition.

It is important to note that the conversion of the benzamido thiadiazole to the triazole thiol is known to proceed via 5-amino-1,2,3-thiadiazole [G. Goerdler and G. Gnad, Chem. Ber., 99, 1618 (1966)].

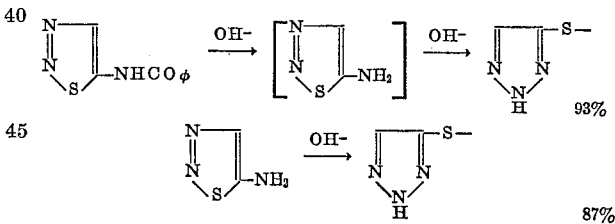

5-amino-1,2,3-thiadiazole can be prepared by an alternative route, not involving diazomethane [D. L. Pain and R. Slack, J. Chem. Soc., 5166 (1965)].

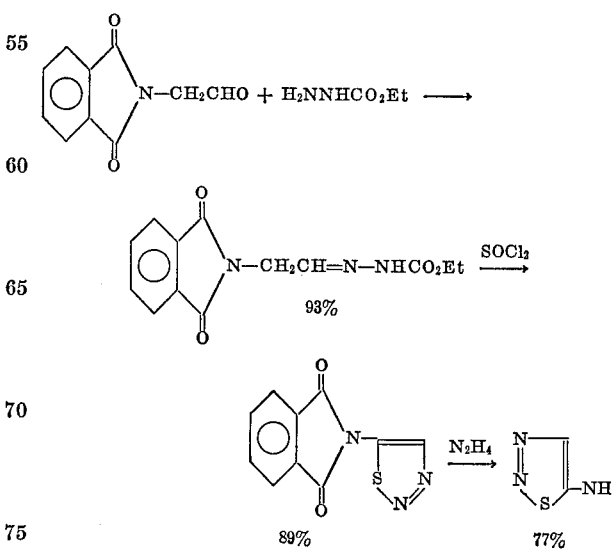

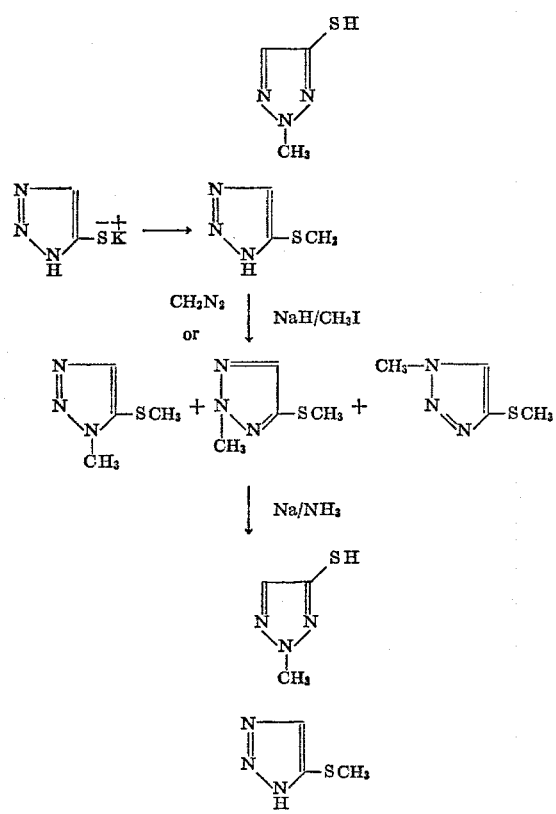

The triazole thiol (4.18 g., 41.3 mmoles) in ethanol (40 ml.) was treated with an equimolar amount of 1.8 N KOH in ethanol and then methyl iodide (6.4 g., 45 mmoles) was added. After ½ hour the solvent was evaporated, the residue was slurried wtih water, the product was extracted with dichloromethane, the extract was dried over sodium sulfate and the solvent was removed *in vacuo*. The solid remaining (4.09 g., 86%) had M.P. 38–42°. After sublimation at 37°/0.001 mm. it had M.P. 46–48°.

*Analysis.*—Calcd. for $C_3H_5N_3S$: C, 31.29; H, 4.37; N, 36.49. Found: C, 31.05; H, 4.41; N, 36.52.

The S-methyl ether could be prepared from the lithium salt (generated with n-$C_4H_9Li$) in tetrahydrofuran and methyl iodide. Yields ranged from 77% to 92%.

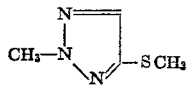

To an ice cold solution of the S-methyl ether (20.88 g., 182 mmoles) in ether was added 0.86 N ethereal diazomethane (225 ml.). The solvent was removed *in vacuo* and the residue was fractionally distilled. The most volatile material, B.P. 91–94/23 mm. was collected (9.0 g.). This material had an NMR spectrum and an IR spectrum identical to that of an authentic specimen (dated provided by Professor M. Begtrup, Technical University of Denmark).

The still residue (10.65 g.) contained a mixture of all three possible S-methyl-N-alkyl compounds.

The total yield was 19.65 g. (83.5%).

*Or*

A suspension of 55% sodium hydride in mineral oil (960 mg.) was washed free of the carrier with benzene, then layered with DMF and cooled to 0° (nitrogen atmosphere). The S-methyl compound (2.32 g., 20 mmoles) was added, and after ½ hour methyl iodide (3.4 g., 24 mmoles) was added and stirring was continued for 1¼ hours. The reaction mixture was poured into a large volume of water, the product was extracted into benzene, the extract was washed with water, dried over magnesium sulfate, and the solvent was removed *in vacuo*. The crude product was a mixture of 3 compounds (1.93 g., 75%) and the desired compound could be obtained by distillation of the most volatile component as before.

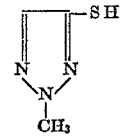

This reaction gave acceptable yields only when the reaction was carried out on a small scale. The N,S-dimethyl compound (1.93 g., 15 mmoles) in liquid ammonia was treated portionwise, in a nitrogen atmosphere, with metallic sodium (690 mg., 30 mmoles). Ammonium chloride (1.6 g., 30 mmoles) was added, and the ammonia was allowed to evaporate. The residue was taken up in water containing 2 N sodium hydroxide (7.5 ml.) and the neutral material was extracted with ethyl acetate. The aqueous phase made acidic to *ca* pH 1 with concentrated hydrochloric acid. The product was extracted into ethyl acetate, the extract was dried over magnesium sulfate, and the solvent was removed *in vacuo*. The residual oil was evaporatively distilled at 95–100/22 mm. The oil thus obtained (708 mg., 41%) was distilled at 78–80°/21 mm.

*Analysis.*—Calcd. for $C_3H_5N_3S$: C, 31.29; H, 4.38; N, 36.49. Found: C, 31.58; H, 4.27; N, 36.57.

7-amino-3-(2-methyl-1,2,3-triazole-4-yl)thiomethyl-3-cephem-4-carboxylic acid

To a stirred suspension of 10.9 g. (0.04 mole) of 7-ACA in 200 ml. of 0.1 M phosphate buffer, pH 6.4, was added 6.8 g. (0.08 mole) of sodium bicarbonate followed by 4.8 g. (0.04 mole) of 4-mercapto-2-methyl-1,2,3-triazole and the mixture stirred and heated at 55° C. for 5 hours under a nitrogen atmosphere. At the end of the heating period, 3 g. of decolorizing carbon ("Darko KB") was added and, after 15 minutes, the warm slurry was filtered and the filtrate adjusted, with stirring to pH 5 with 6 N HCl. After stirring and cooling to 10° C., the product was collected by filtration, washed wtih water and then acetone and air dried. The yield of 7-amino-3-(2-methyl-1,2,3 - triazole - 4 - yl)thiomethyl-3-cephem-4-carboxylic acid was 7 g.; dec. pt. 198° C. The IR and NMR spectra were consistent with the desired structure.

*Analysis.*—Calcd. for $C_{11}H_{13}N_5O_2S_2$: C, 40.37; H, 4.01; N, 21.41. Found: C: 40.19; H, 4.05; N, 20.61.

DESCRIPTION OF THE PREFERRED EMBODIMENTS

Example 1

7 - [α - D-(—) - amino-α-phenylacetamido]-3-(2-methyl - 1,2,3 - triazole - 4 - yl)thiomethyl-3-cephem-4-carboxylic acid.—To a stirred suspension of 6.51 g. (0.02 mole) of 7-amino - 3 - (2-methyl-1,2,3-triazole-4-yl)thiomethyl-3-cephem-4-carboxylic acid in 75 ml. of methylene chloride was added 5.4 ml. (0.038 mole) of triethylamine and 3 ml. (0.023 mole) of N,N-dimethylaniline. The resulting solution was cooled to 5° C. and 5.1 ml. (0.04 mole) of triethylchlorosilane was added and, after 10 minutes, the mixture was gently refluxed for 25 minutes. Next, the mixture was cooled and, with stirring, 4.2 g. (0.02 mole) of D-(—)-α-amino-α-phenylacetyl chloride hydrochloride was added at 5° C. The temperature was maintained at 10° C. for 2½ hours under a nitrogen atmosphere. Next, 50 ml. of water was added and the vigorously stirred mixture was brought to pH 2 with 20% NaOH. The aqueous phase was separated, stirred 10 minutes with 3 g. of decolorizing carbon ("Darko KB"), filtered and, under a layer of 50 ml. of ether, the pH was adjusted to 4 with 20% NaOH. The product crystallized and, after 15 minutes, was collected by filtration, washed with water, then acetone and air dried. The yield of 7-[α-D-(—)-amino-α-phenylacetamido]-3-(2-methyl-1,2,3-triazole-4-yl)thiomethyl-3-cephem-4-carboxylic acid was 6.05 g.; dec. pt. 155° C. The IR and NMR spectra were entirely consistent with the desired structure.

*Analysis.*—Calcd. for $C_{19}H_{20}N_6O_4S_2 \cdot H_2O$: C, 47.60; H, 4.63; N, 17.54. Found: C, 47.57; H, 5.03; N, 16.15.

This sample of 7-[D-(α-amino-α-phenylacetamido)]-3-[S-(2-methyl-1,2,3-triazole-4-yl)thiomethyl]-3-cephem-4-carboxylic acid (called New Compound) after solution in DMSO (dimethyl sulfoxide) at 14 mgm./ml. followed by dilution with Nutrient Broth was found to exhibit the following Minimum Inhibitory Concentrations (M.I.C.) in mcg./ml. versus the indicated microorganisms as determined by overnight incubation at 37° C. by Tube Dilution. Results with two old, orally absorbed cephalosporins are also given.

TABLE 1
[M.I.C. in mcg./ml.]

| Organism | | New cpd. | Cephalexin | Ceph aloglycin |
|---|---|---|---|---|
| *D. pneumoniae* plus 5% serum* | A9585 | 0.16 | 0.3 | 0.13 |
| *Str. pyogenes* plus 5% serum* | A9604 | <0.05 | 0.3 | 0.13 |
| | | .03 | 0.16 | 0.3 |
| *S. aureus* Smith | A9537 | .01 | 1.3 | 1.3 |
| | | .25 | 0.6 | 0.6 |
| *S. aureus* Smith plus 50% serum | A9537 | .02 | 1.3 | 1.3 |
| | | >.5 | 1.3 | 1.3 |
| *S. aureus* BX1633-2 at 10⁻³ dil'n | A9606 | 1.3 | 2 | 1.3 |
| | | 1 | 2 | 1.3 |
| *S. aureus* BX1633-2 at 10⁻² dil'n | A9606 | 8 | 4 | 2.5 |
| | | 2 | 4 | 1.3 |
| *S. aureus* meth.-resistant | A15097 | 8 | 16 | 8 |
| | | 8 | 32 | 4 |
| *S. aureus* Smith at 10⁻³ dil'n | A9748 | 16 | 32 | 8 |
| | | 8 | 32 | 4 |
| *S. aureus* Smith at 10⁻² dil'n | A9748 | 32 | 63 | 16 |
| | | 16 | 63 | 8 |
| *Sal. enteritidis* | A9531 | 1.3 | 4 | 0.6 |
| | | <0.25 | 2 | 0.3 |
| *E. coli* Juhl | A15119 | 16 | 8 | 4 |
| | | 8 | 8 | 1 |
| *E. coli* | A9675 | 32 | 16 | 8 |
| | | 16 | 16 | 4 |
| *K. pneumoniae* | A9977 | 8 | 8 | 2.5 |
| | | 4 | 4 | 0.6 |
| *K. pneumoniae* | A15130 | 16 | 16 | 4 |
| | | 16 | 16 | 2 |
| *Pr. mirabilis* | A9900 | 8 | 8 | 1.3 |
| | | 8 | 4 | 0.6 |
| *Pr. morganii* | A15153 | 32 | >125 | 63 |
| | | 63 | >125 | 125 |
| *Pr. aeruginosa* | A9843A | >125 | >125 | >125 |
| | | >125 | >125 | >125 |
| *Ser. marcescens* | A20019 | >125 | >125 | >125 |
| | | 125 | >125 | >125 |

*50% nutrient broth, 45% antibiotic assay broth.

Blood levels in the mouse after oral administration were determined with the following results:

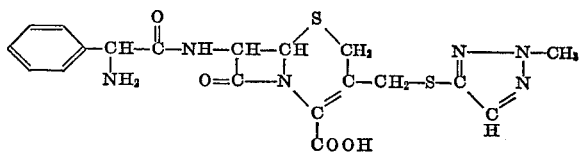

| R= | Dose, mgm./kg. | Blood level in mcg./ml. Hours after administration— | | | |
|---|---|---|---|---|---|
| | | 0.5 | 1 | 2 | 3.5 |
| 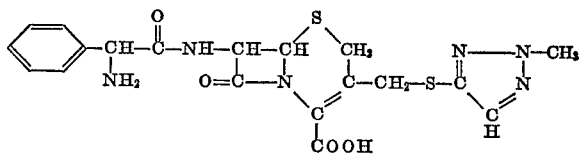 | 100 | 31.3 | 20.6 | 8.3 | 4.4 |
| | 100 | 27.4 | 22.8 | 9.6 | 4.9 |
| H (cephalexin)-monohydrate | 100 | 51 | 22.9 | 6.2 | <2.5 |
| | 100 | 41.2 | 25.3 | 6.8 | <3.0 |

Example 2

Sodium 7-[D-(α-amino-α-phenylacetamido)]-3-[S-(2-methyl-1,2,3-triazole-4-yl)thiomethyl]-3-cephem-4-carboxylate.—To a stirred aqueous suspension of the zwitterionic form of 7-[D-(α-amino-α-phenylacetamido)] 3-[S-(2-methyl-1,2,3-triazole-4-yl)methyl]-3-cephem-4-carboxylic acid (0.8 mmole) is added 1 N aqueous sodium hydroxide at room temperature until a clear solution (pH 10.8) is obtained. This solution is immediately freeze-dried to give impure, solid sodium 7-[D-(α-amino-α-phenylacetamido)]-3-[S-(2-methyl-1,2,3-triazole-4-yl)thiomethyl]-3-cephem-4-carboxylate.

Example 3

7-[D-(—)-α-amino-α-(3-thienyl)-acetamido]-3-[S-(2-methyl-1,2,3-triazole-4-yl)-thiomethyl]-3-cephem-4-carboxylic acid.—This compound is prepared by substituting an equimolar weight of D-(—)-α-amino-α-(3-thienyl)-acetyl chloride hydrochloride in the procedure of Example 1 for the D-(—)-α-amino-α-phenylacetyl chloride hydrochloride used therein.

Example 4

7-[D-(—)-α-amino-α-(2-thienyl)-acetamido]-3-[S-(2-methyl-1,2,3-triazole-4-yl)-thiomethyl]-3-cephem-4-carboxylic acid.—Following the exact same procedure as in Example 1 except using D-(—)-α-amino-α-(2-thienyl)-acetylchloride hydrochloride gives this compound.

I claim:

1. The compound having the D configuration in the sidechain of the formula or a nontoxic, pharmaceuticaly acceptable salt thereof.

2. The compound having the D configuration in the sidechain of the formula

3. The sodium salt of the compound of claim 2.
4. The potassium salt of the compound of claim 2.
5. The zwitterion form of the compound of claim 2.
6. A nontoxic, pharmaceutically acceptable acid addition salt of the compound of claim 2.

References Cited
UNITED STATES PATENTS
3,641,021   2/1972   Ryan _____ 260—239.1
3,516,997   6/1970   Takano et al. _____ 260—243 C NICHOLAS S. RIZZO, Primary Examiner U.S. Cl. X.R.
424—246